United States Patent
Caruso et al.

(10) Patent No.: US 8,182,205 B2
(45) Date of Patent: May 22, 2012

(54) GAS TURBINE ENGINE WITH INSULATED COOLING CIRCUIT

(75) Inventors: Philip Caruso, Simpsonville, SC (US);
Dwight Davidson, Greer, SC (US);
Yang Liu, Simpsonville, SC (US);
William Parker, Simpsonville, SC (US);
Roger Walker, Piedmont, SC (US);
Sivaraman Vedhagiri, Greer, SC (US)

(73) Assignee: General Electric Company, Schenectady, NY (US)

( * ) Notice: Subject to any disclaimer, the term of this patent is extended or adjusted under 35 U.S.C. 154(b) by 1342 days.

(21) Appl. No.: 11/671,933

(22) Filed: Feb. 6, 2007

(65) Prior Publication Data
US 2009/0324397 A1 Dec. 31, 2009

(51) Int. Cl.
*F04D 31/00* (2006.01)
(52) U.S. Cl. ............................ 415/116; 415/176; 416/95
(58) Field of Classification Search .................. 415/115, 415/116, 117, 220, 221, 176; 416/90 R, 416/93 R, 95, 96 R
See application file for complete search history.

(56) References Cited

U.S. PATENT DOCUMENTS

| | | | | |
|---|---|---|---|---|
| 2,780,435 A * | 2/1957 | Jackson | ...................... | 416/90 R |
| 2,859,935 A * | 11/1958 | Roesch | ........................ | 415/115 |
| 3,045,965 A * | 7/1962 | Bowmer | ..................... | 416/90 R |
| 3,271,004 A * | 9/1966 | Smuland | ........................ | 416/95 |
| 3,678,555 A * | 7/1972 | Hansen | ...................... | 29/889.21 |
| 4,156,582 A * | 5/1979 | Anderson | .................. | 416/96 R |
| 4,162,136 A * | 7/1979 | Parkes | ........................ | 416/97 R |
| 4,218,179 A * | 8/1980 | Barry et al. | .................... | 415/114 |
| 4,418,455 A * | 12/1983 | Cohn | ......................... | 29/889.722 |
| 4,492,517 A * | 1/1985 | Klompas | ....................... | 415/139 |
| 5,482,431 A * | 1/1996 | Taylor | ............................ | 415/111 |
| 6,398,485 B1 * | 6/2002 | Frosini et al. | ................. | 415/115 |
| 6,398,518 B1 * | 6/2002 | Ingistov | ........................ | 417/244 |
| 6,884,023 B2 * | 4/2005 | Dube et al. | .................... | 415/116 |
| 7,033,135 B2 * | 4/2006 | Mortzheim et al. | .......... | 415/115 |
| 7,201,564 B2 * | 4/2007 | Bolms et al. | ................. | 416/97 R |
| 2003/0086785 A1 * | 5/2003 | Bunker et al. | ................. | 415/115 |

* cited by examiner

*Primary Examiner* — Edward Look
*Assistant Examiner* — Aaron R Eastman
(74) *Attorney, Agent, or Firm* — Sutherland Asbill & Brennan LLP

(57) ABSTRACT

A gas turbine engine is provided comprising a compressor with an insulated cooling circuit. The compressor comprises a compressor casing having a compression chamber and at least one stator and at least one rotor disposed in the compression chamber, the at least one stator comprising a stator body having a plurality of tubes for transporting cooling air through passages in the stator body into the compression chamber. The plurality of tubes are surrounded by an air gap for insulating the tubes from the stator body.

20 Claims, 6 Drawing Sheets

-- Prior Art --

GAS TURBINE ENGINE WITH INSULATED COOLING CIRCUIT

FIELD OF INVENTION

This invention relates to cooling circuits in gas turbine engines. In particular, this invention relates to a device for providing cooling air to a gas turbine engine, comprising an insulation barrier to reduce the heat pickup by the cooling air from the surrounding hot gases.

BACKGROUND OF THE INVENTION

Gas turbine engines are one of the most efficient means of producing energy. Gas turbine power, efficiency, and economics generally increase when the temperature of gas flowing through the turbine increases. A limiting factor of most gas turbine engines is the turbine inlet temperature, however, because the blade metal temperature generally must be kept below 1400° F. to avoid hot corrosion problems.

Advances in air cooling and blade metallurgy have permitted the inlet temperatures of gas turbines to increase considerably. Specifically, by providing a means to remove heat from the blades, the turbine can be operated with a combustion gas temperature higher than the metallurgical limit of the blade material. Air cooling technology bleeds cooling air from the compressor and directs the cooling air to the stator, rotor, and other parts of the rotor and casing.

Current cooling technology relies on stator passages to convey cooling air from the outer surfaces of the casing to the engine centerline regions. Heat pickup in these configurations is significant, resulting in a pronounced reduction in both cycle efficiency and power output.

Thus, there exists a need to reduce the heat pickup in the stator passages such that the cooling air maintains a low temperature, desirably close to its inlet temperature. Such improvements will minimize the amount of cooling air required at the lowest temperature to maximize cycle efficiency and power output.

BRIEF DESCRIPTION OF THE INVENTION

This invention addresses the foregoing problems by providing a gas turbine engine comprising a compressor comprising an insulated cooling circuit, a combustor, and a turbine. The compressor comprises a compressor casing having a compression chamber and at least one stator and at least one rotor disposed in the compression chamber. The at least one stator comprises a stator body having a plurality of passages extending therethrough from an outwardly positioned opening to an inwardly positioned opening, and a plurality of tubes for transporting cooling air through the stator body into the compression chamber. The plurality of tubes extend through the respective plurality of passages from an inlet to an outlet and are spaced from walls of the respective passages to form an air gap between each tube and walls of the respective passages.

In a particular embodiment, the insulated cooling circuit further comprises at least one spacer between the plurality of tubes and the walls of the respective passages. In an alternative embodiment, the stagnant air gap comprises a high temperature insulation to further reduce heat transfer between the hot gas of the gas turbine engine and the cooling air of the cooling circuit.

Other objects, features, and advantages of this invention will be apparent from the following detailed description, drawings, and claims.

DETAILED DESCRIPTION OF THE INVENTION

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention addresses the above-described needs by providing a compressor of a gas turbine engine, the compressor comprising an insulated cooling circuit. The insulated cooling circuit minimizes the heat pickup of the cooling air, and accordingly, requires less cooling air to maximize cycle efficiency and power output. Embodiments of this invention are described in detail below and are illustrated in FIG. 1-5.

Figure 1:
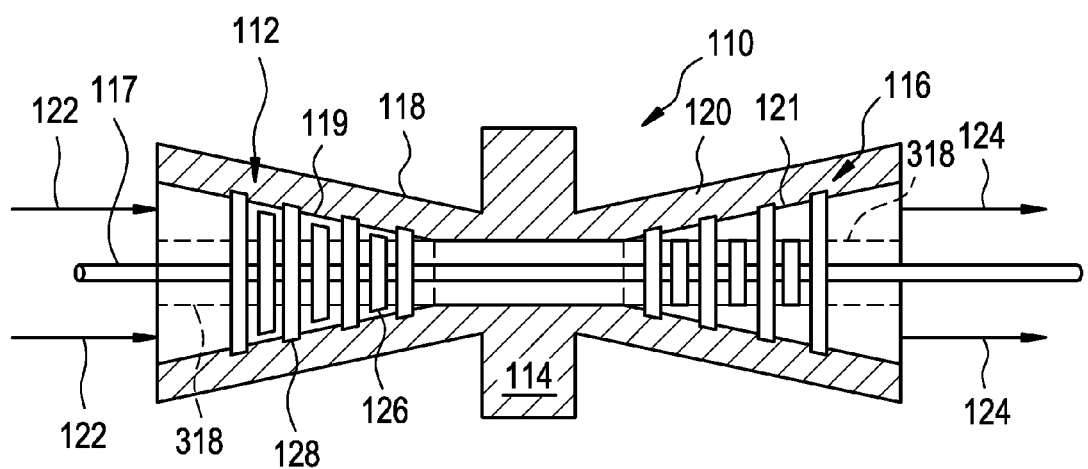
FIG. 1 is a partial cross section of a known gas turbine engine.

A typical gas turbine engine 110, illustrated in FIG. 1, comprises a compressor 112 in serial flow communication with a combustor 114, and a turbine 116. The compressor 112 and turbine 116 may be coupled by a driveshaft 117, which also may couple the turbine 116 and drive an electrical generator (not shown). The turbine further may comprise compressor and turbine casings 118, 120, which enclose a compressor chamber 119 and a turbine chamber 121, respectively.

In particular embodiments, the gas turbine engine 110 may be any engine which is commercially available from the General Electric Company, although the gas turbine engine 110 illustrated and described herein is exemplary only. Accordingly, the gas turbine engine 110 is not limited to the gas turbine engine as shown in FIG. 1 and described herein, but rather, may be any gas turbine known to those of ordinary skill in the art. For example, in an alternative embodiment, the gas turbine engine 110 may comprise a multi-shaft gas turbine engine having two shafts for separately driving an electrical generator (not shown) and the compressor 112.

In operation, air (as indicated by arrows 122) may flow into the gas turbine engine 110 through the compressor chamber 119 and may be compressed. Compressed air then may be channeled to the combustor 114 where it may be mixed with fuel (not shown) and ignited. The expanding hot gases from the combustor 114 may drive the rotating turbine 116 and may exit (as indicated by arrows 124) the gas turbine engine 110 through an exhaust diffuser (not shown). Additionally, in some embodiments, exhaust gases from the turbine engine 110 may be supplied to a heat recovery steam generator (not shown) that generates steam for driving a steam turbine (not shown).

Figure 2A:
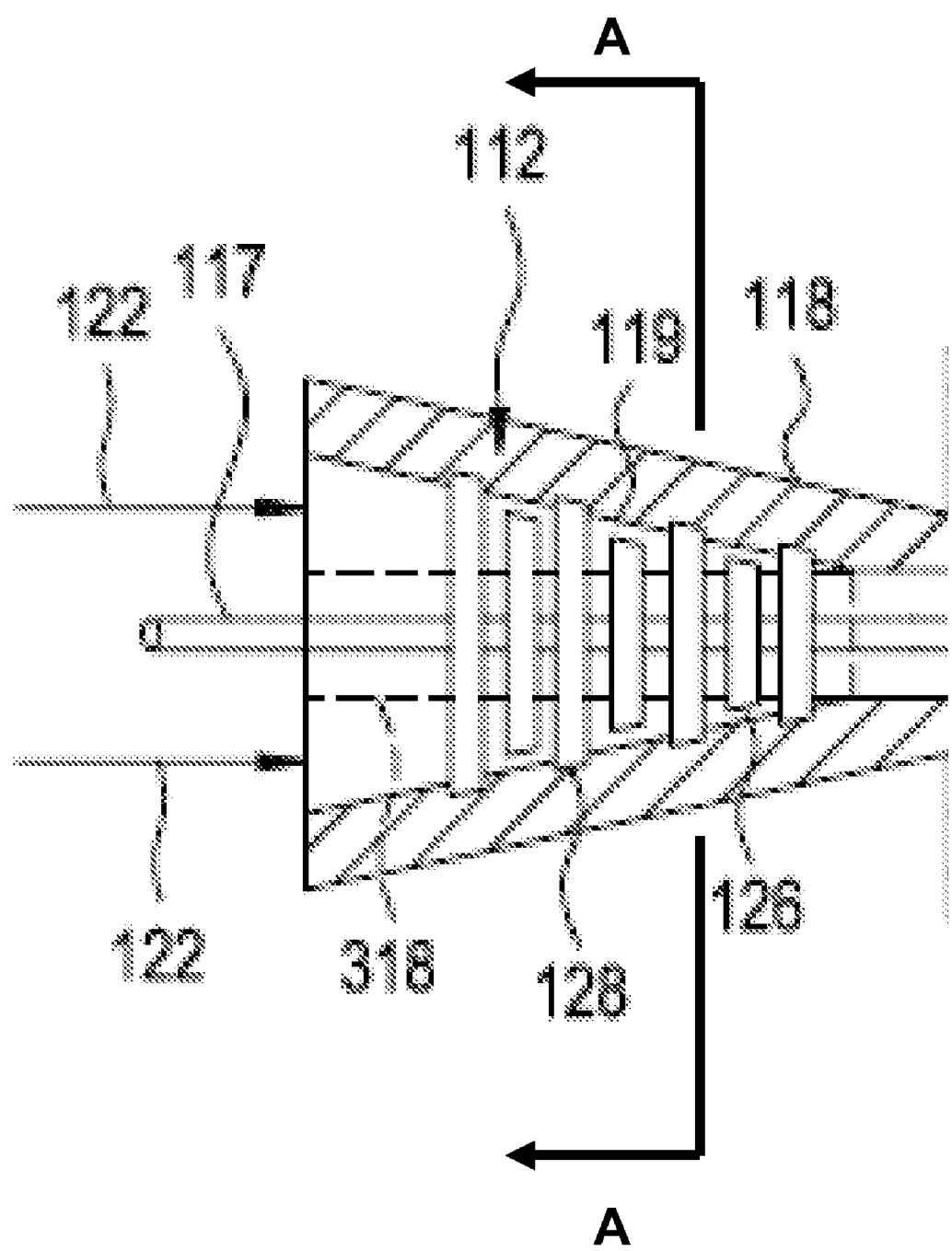
FIG. 2A is a partial cross section of a gas turbine engine compressor according to a particular embodiment.
Figure 2B:
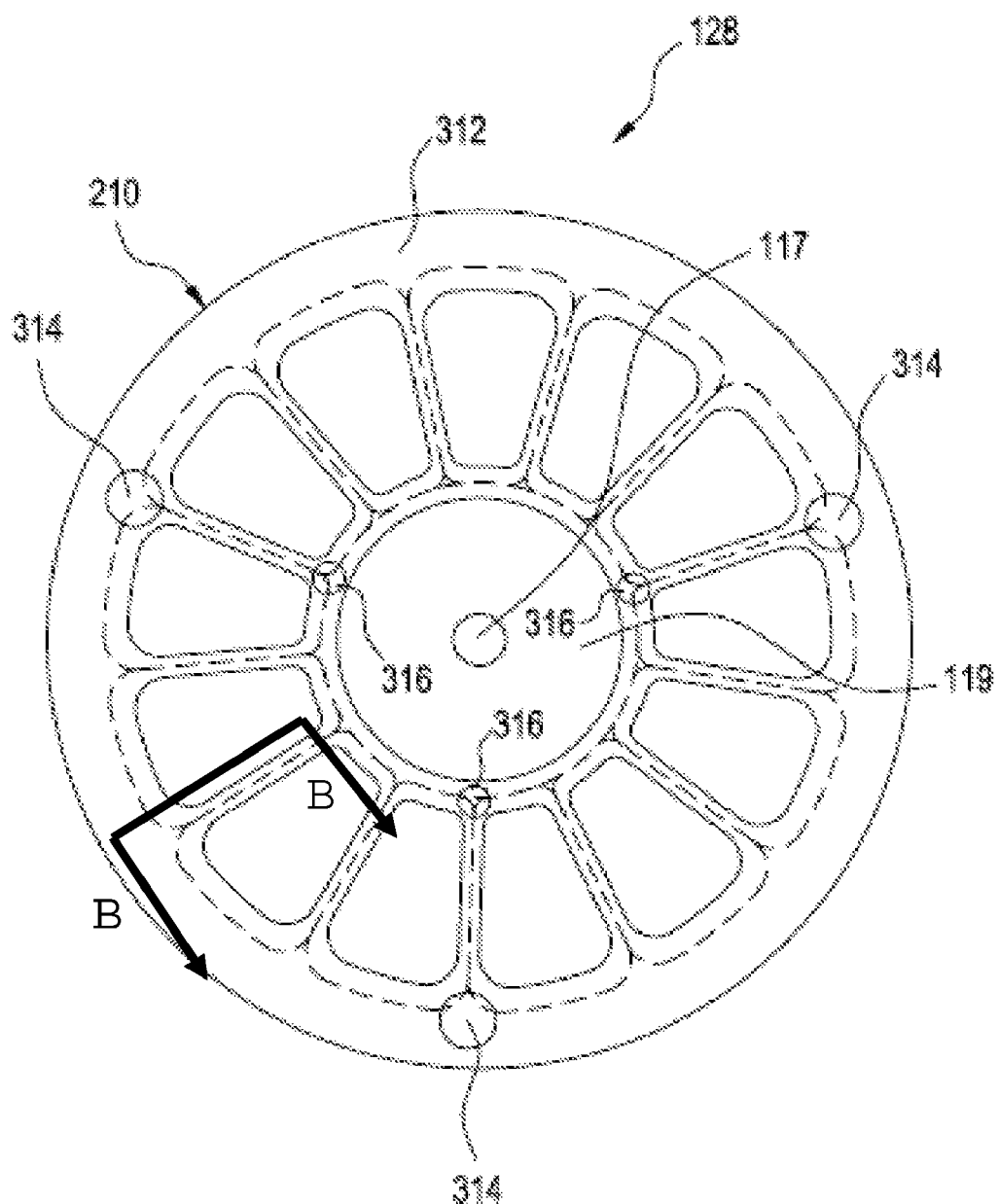
FIG. 2B is a view of a stator comprising an insulated tube passage system used in the gas turbine engine compressor of FIG. 2A taken along lines A-A in FIG. 2A according to a particular embodiment.
Figure 2C:
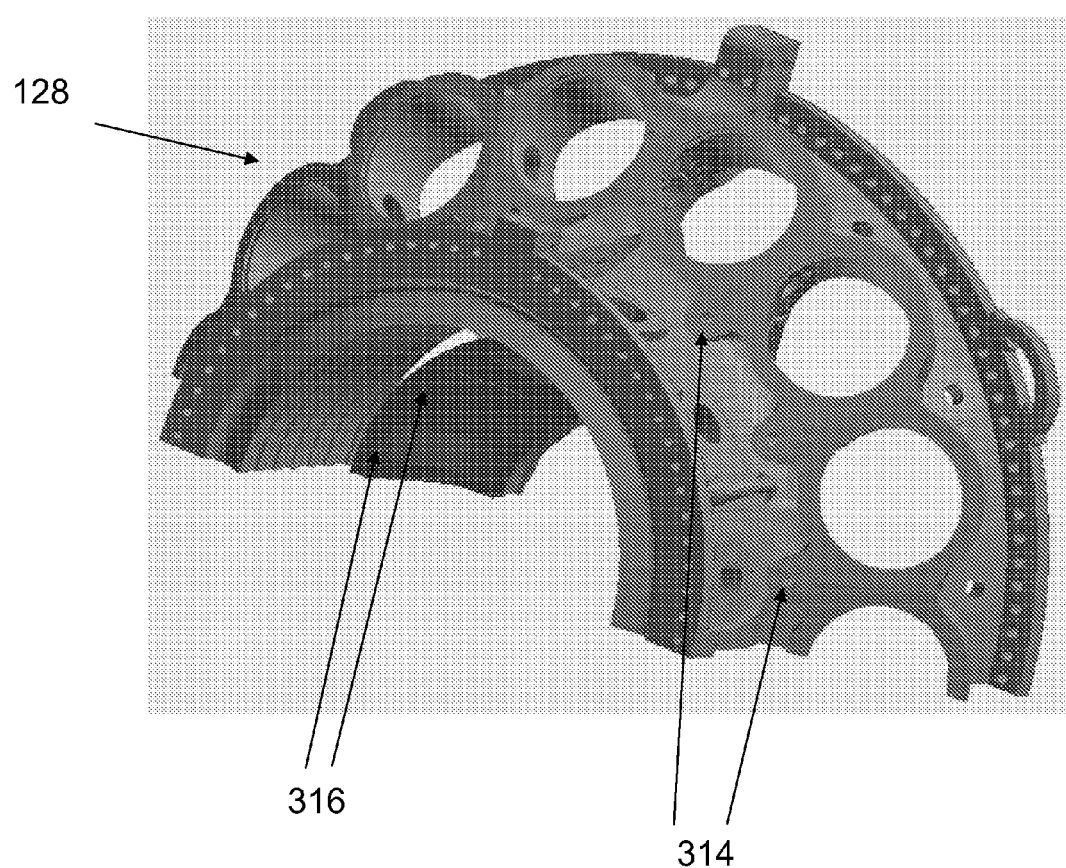
FIG. 2C is a perspective of a stator comprising an insulated tube passage system according to FIG. 2B according to a particular embodiment.
Figure 3:
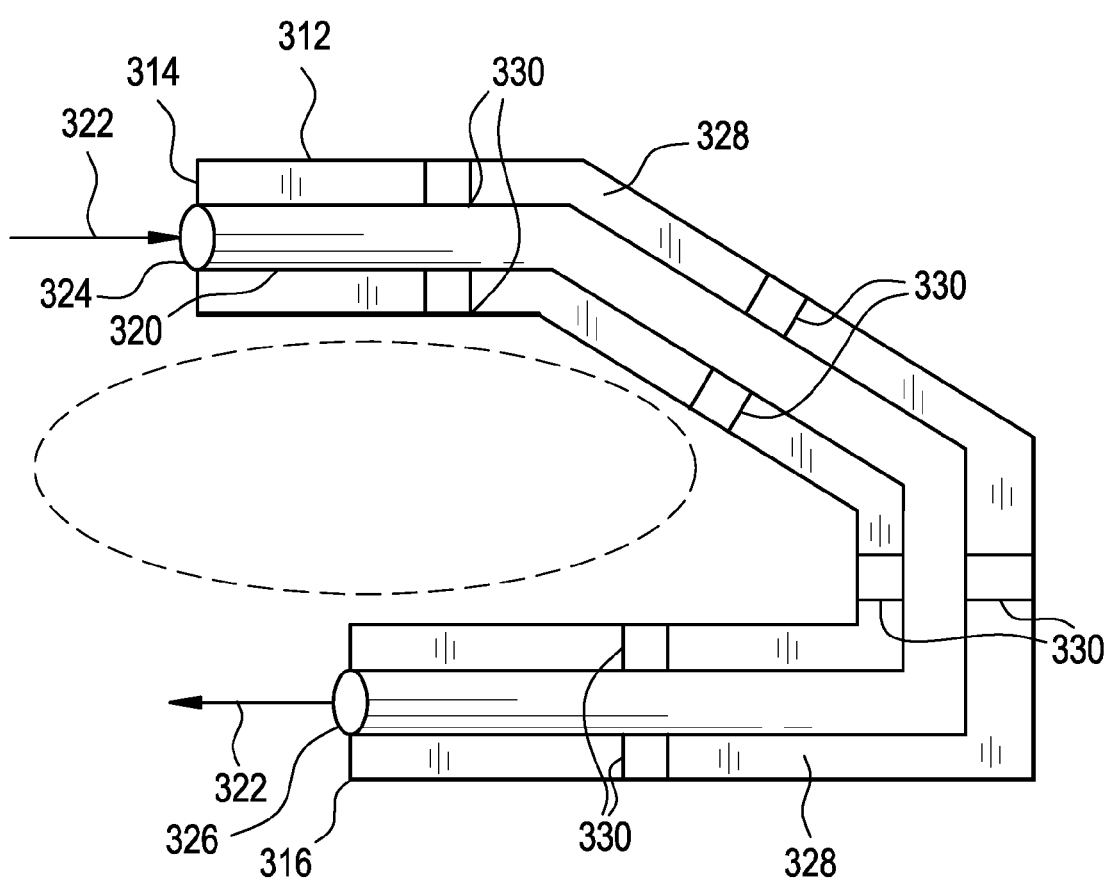
FIG. 3 is a view of an embodiment of a stator comprising an insulated tube passage system for minimizing heat pick-up in a gas turbine engine compressor taken along lines B-B of FIG. 2B according to a particular embodiment of the invention.

The compressor 112, illustrated in FIGS. 1 and 2A, generally comprises the compressor casing 118 having the compressor chamber 119 and at least one rotor 126 and at least one stator 128 disposed in the compression chamber. In a particular embodiment, the at least one stator 128 comprises a stator body 210 having an insulated cooling circuit 310, illustrated in FIG. 3. The insulated cooling circuit 310 is disposed in a plurality of passages 312 extending through the stator body 210, as represented by the broken lines of FIG. 2B. In a particular embodiment, the plurality of passages 312 have an outwardly positioned opening 314 and an inwardly positioned opening 316 in the stator body 210. The outwardly positioned opening 314 is located further from the central region 318 of the gas turbine engine 110 than is the inwardly positioned opening 316.

In another particular embodiment, the stator body 210 further comprises a plurality of tubes 320 for transporting a cooling air (as indicated by arrows) 322 to the compression chamber 119. In a particular embodiment, the plurality of tubes 320 transport the cooling air 322 to a central region (as indicated by the dashed lines) 318 of the gas turbine engine 110 near and about the driveshaft 117. The plurality of tubes 320 extend through the respective plurality of passages 312 from respective inlets 324 to respective outlets 326 in the central region 318 of the gas turbine engine 110, and desirably proximate the inwardly positioned opening 316 so that the cooling air 322 flows from the outlets into the central region of the gas turbine engine. As used herein, proximate means that the outlets 326 of the plurality of tubes 320 are contiguous or nearly contiguous with the inwardly positioned openings 316.

In one embodiment, the plurality of tubes 320 are spaced from the walls of the respective plurality of passages 312 to form an air gap 328 between the tubes and walls of the respective passages. Desirably the air gap 328 is stagnant, meaning that the air gap comprises a pocket of air without the flow of any air, thereby restricting the mode of heat transfer through the stagnant air gap to natural convection. Accordingly, the stagnant air gap 328 provides an insulation barrier for the plurality of tubes 320, thereby minimizing the heat transfer between the stator body 210 and the plurality of tubes 320 transporting the cooling air 322.

In a particular embodiment, the stator body 210 further comprises a plurality of spacers 330 disposed in the passages 312 for spacing the tubes 320 from the walls of the passages 312. In another particular embodiment, the stator body 210 further comprises a high temperature insulation disposed in the air gap 328 between the tubes 320 and the walls of the passages 312.

In one embodiment, the plurality of tubes 320 are welded to the stator body 210. In an alternative embodiment, the plurality of tubes 320 are fastened to the stator body 210 with an air-tight tube fitting.

Generally, the plurality of tubes 320 comprise walls having a thickness from about 0.040 inches to about 0.080 inches. In a particular embodiment, the plurality of tubes 320 comprise materials that are resistant to high temperatures and corrosion. In a particularly desirable embodiment, the plurality of tubes 320 comprise a nickel alloy. Alternatively, the plurality of tubes 320 comprises stainless steel. In another particular embodiment, the stator 128 comprises materials that are high strength and resistant to high temperatures and corrosion. In a particularly desirable embodiment, the stator 128 comprises CrMoV. Alternatively, the stator 128 comprises cast iron or carbon steel. In still another particular embodiment, the spacers 330 generally comprise materials that are resistant to high temperatures and wear. In a particularly desirable embodiment, the spacers 330 comprise a cobalt alloy. Alternatively, the spacers 330 comprise a nickel alloy or stainless steel.

The air gap 328 desirably has a thickness (t) (illustrated in FIGS. 5A-5C) in the range of about 0.040 inches to about 0.080 inches. In one embodiment, the air gap 328 has a thickness of about 0.050 inches. The air gap 328 minimizes the heat pickup of the cooling air 322 between the inlet 324 and outlet 326 of the tubes 320. In one embodiment, the temperature change of the cooling air 322 between the inlet 324 and outlet 326 is no more than about 100° F., more desirably no more than about 50° F., even more desirably no more than about 25° F., and still even more desirably no more than about 10° F.

In a particular embodiment, the flow rate of the cooling air 322 is in the range of about 2.0 lbm/sec/channel to about 3.0 lbm/sec/channel and the inlet 324 temperature of the cooling air 322 is in the range of about 500° F. to about 650° F.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLE

Figure 4:
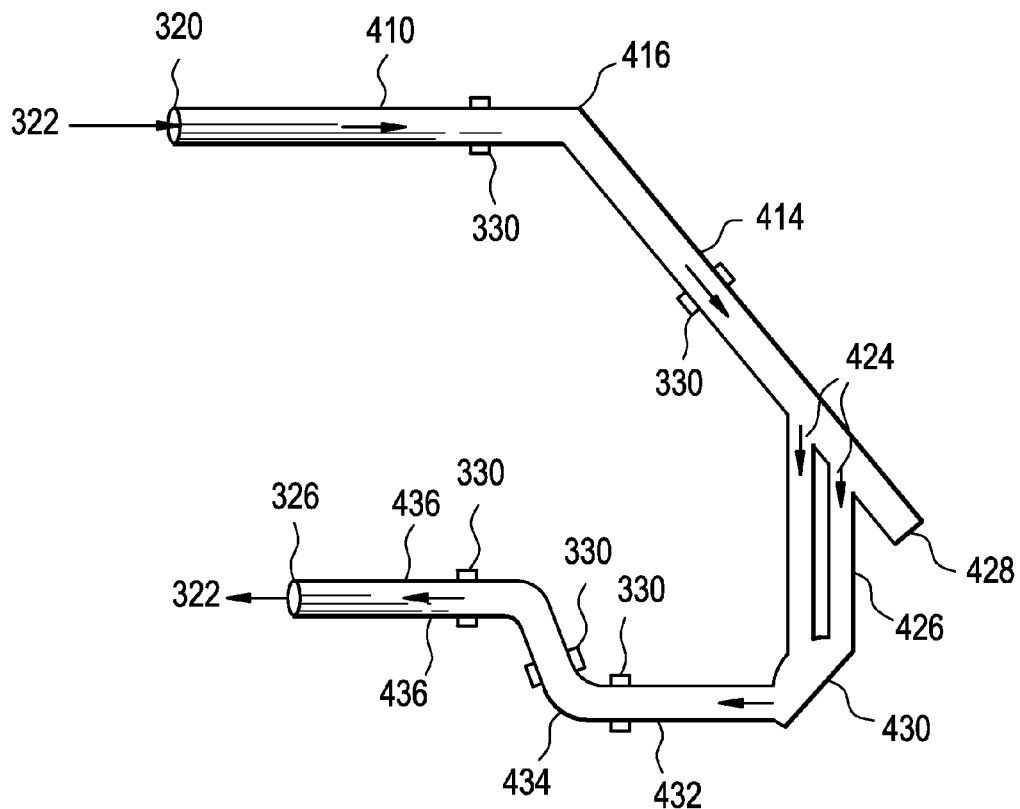
FIG. 4 is a view of an insulated tube passage system taken along lines B-B of FIG. 2B according to a particular embodiment of the invention.

An embodiment of the insulated cooling circuit 310 of a compressor 112 is illustrated in FIG. 4. The compressor 112 comprises a compressor casing 118 having a compression chamber 119 and comprises at least one stator 128 disposed in the compression chamber 119. The at least one stator generally comprises a stator body 210 having a plurality of passages 312 having an outwardly positioned opening 314 and an inwardly positioned opening 316. A cooling air 322 is transported through a plurality of tubes 320, which extend from respective inlets 324 through the plurality of passages 312, 324 to respective outlets 326 proximate the inwardly positioned opening 316. The plurality of tubes 320 are welded or fastened by air-tight tube fittings to the walls of the passages 312. Spacers 330 between the tubes 320 and the walls of the passages 312 establish a desired stagnant air gap 328. The stagnant air gap 328 provides an insulation barrier to the cooling air 322 flowing through the plurality of tubes 320.

Figure 5A:
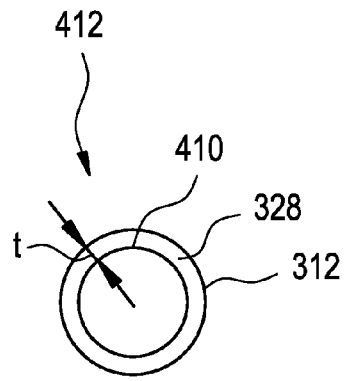
FIGS. 5A, 5B, 5C are cross-sectional views of different components of the insulated tube passage system according to the particular embodiment illustrated in FIG. 4.
Figure 5B:
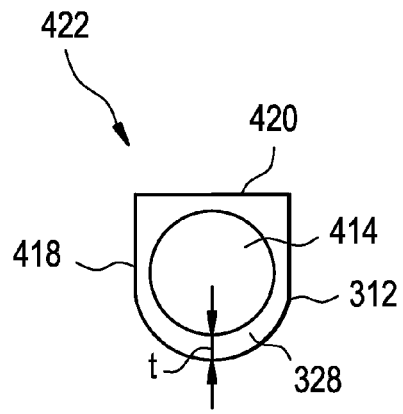
Figure 5C:
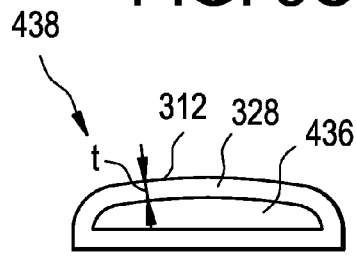

A first length of tube 410 comprises a horizontal tube, the cross-section 412 of which is illustrated in FIG. 5A. The first length of tube 410 joins a second length of tube 414 at an elbow 416, the second length of tube comprising an inclined tube. The second length of tube 414 fits within a U shaped slot 418 sealed by a welded plate 420, the cross-section 422 of which is illustrated in FIG. 5B. Two holes 424 in the side of the second length of tube 414 join a third length of tube 426, the third length of tube comprising two parallel tubes. The end of the second length of tube 414 is sealed with an end cap 428. The third length of tube 426 directs the cooling air into a elbow cavity 430 that directs the cooling air into a fourth length of tube 432, the fourth length of tube comprising a horizontal tube. The fourth length of tube 432 comprises a diffuser-like turning guide 434, which minimizes energy loss and directs the cooling air into the fifth length of tube 436. The fifth length of tube 436 comprises a flat channel, the cross-section 438 of which is illustrated in FIG. 5C, leading to the outlet 326 at the central region of the gas turbine engine 318.

This particular embodiment of an insulated tube passage system resulted in a 93% reduction in the temperature change of the cooling air between the inlet at the external casing of the stator and the outlet at the engine centerline region when compared to the prior art with a identical mass flow rate. Accordingly, for the same outlet temperature of cooling air, a smaller heat exchanger can be used to cool the compressor discharge temperature due to the fact that the inlet temperature of the cooling air can be set to a much higher value. With the same mass flow rate of cooling air, the insulated tube passage system will reject less heat to the bottoming cycle and thereby increase the combined cycle thermal efficiency and power output.

It should be understood that the foregoing relates to a particular embodiment of the present invention, and that numerous changes may be made therein without departing from the scope of the invention as defined from the following claims.

We claim:

1. A gas turbine engine comprising:
   a compressor comprising a compressor casing having a compression chamber and at least one stator and at least one rotor disposed in the compression chamber,
   wherein the at least one stator comprises
      a stator body having a plurality of stator blades and a plurality of passages extending through the plurality of stator blades, each passage extending from an outwardly positioned opening to an inwardly positioned opening, and
      a plurality of tubes for transporting cooling air through the stator body into the compression chamber, each of the plurality of tubes extending through the respective plurality of passages from an inlet to an outlet,
      wherein each tube is spaced from walls of the respective passages to form an air gap between each tube and walls of the respective passages for insulating the tubes from the stator body;
   a combustor; and
   a turbine.

2. The gas turbine engine according to claim 1, wherein the gas turbine engine has a central region about a longitudinal driveshaft extending through the gas turbine engine and the plurality of tubes transport the cooling air to the central region.

3. The gas turbine engine according to claim 2, wherein the plurality of tubes extend from the respective inlets through the respective outwardly positioned openings and to the central region through the respective outlets of the plurality of tubes.

4. The gas turbine engine according to claim 1, wherein the stator further comprises a plurality of spacers disposed in the passages for spacing the tubes from the walls of the passages.

5. The gas turbine engine according to claim 4, wherein the spacers comprise a cobalt alloy.

6. The gas turbine engine according to claim 1, wherein the tubes and the stator body are fitted together with an air-tight tube fitting.

7. The gas turbine engine according to claim 1, wherein the air gap comprises a thickness in the range of about 0.040 inches to about 0.080 inches.

8. The gas turbine engine according to claim 1, wherein the air gap comprises a thickness of about 0.050 inches.

9. The gas turbine engine according to claim 1, wherein the air gap comprises stagnant air.

10. The gas turbine engine according to claim 1, wherein the air gap comprises a high temperature insulation.

11. The gas turbine engine according to claim 1, wherein the tubes comprise walls having a thickness in the range of about 0.040 inches to about 0.080 inches.

12. The gas turbine engine according to claim 1, wherein the stator comprises CrMoV.

13. The gas turbine engine according to claim 1, wherein the tubes comprise a nickel alloy.

14. The gas turbine engine according to claim 1, wherein the cooling air has a temperature change of no more than about 100° F. between the inlet and the outlet of the tubes.

15. The gas turbine engine according to claim 1, wherein the cooling air has a temperature change of no more than about 50° F. between the inlet and the outlet of the tubes.

16. The gas turbine engine according to claim 1, wherein the cooling air has a temperature change of no more than about 25° F. between the inlet and the outlet of the tubes.

17. The gas turbine engine according to claim 1, wherein the cooling air has a temperature change of no more than about 10° F. between the inlet and the outlet of the tubes.

18. The gas turbine engine according to claim 1, wherein the cooling air comprises a flow rate in the range of about 2.0 lbm/sec/channel to about 3.0 lbm/sec/channel.

19. The gas turbine engine according to claim 1, wherein the cooling air comprises an inlet temperature in the range of about 500° F. to about 650° F.

20. The gas turbine of claim 1, further comprising a driveshaft, wherein the plurality of tubes transport cooling air to a central region of the gas turbine, the central region being near and about the driveshaft.

* * * * *